Oct. 30, 1951  T. C. GERNER  2,573,138
DRIVE SHAFT BUSHING ASSEMBLY
Filed April 29, 1948  2 SHEETS—SHEET 1
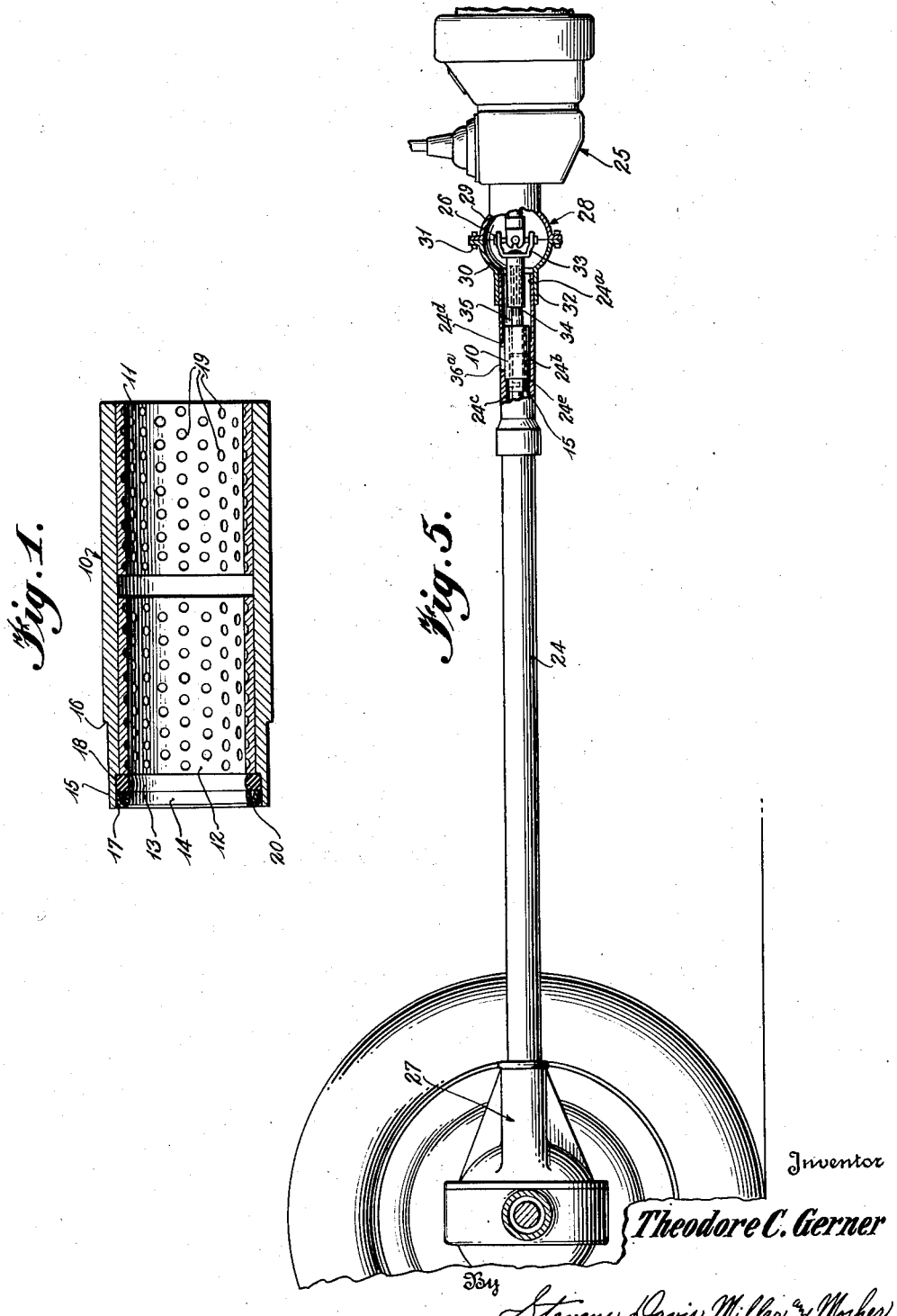

Oct. 30, 1951  T. C. GERNER  2,573,138
DRIVE SHAFT BUSHING ASSEMBLY
Filed April 29, 1948  2 SHEETS—SHEET 2
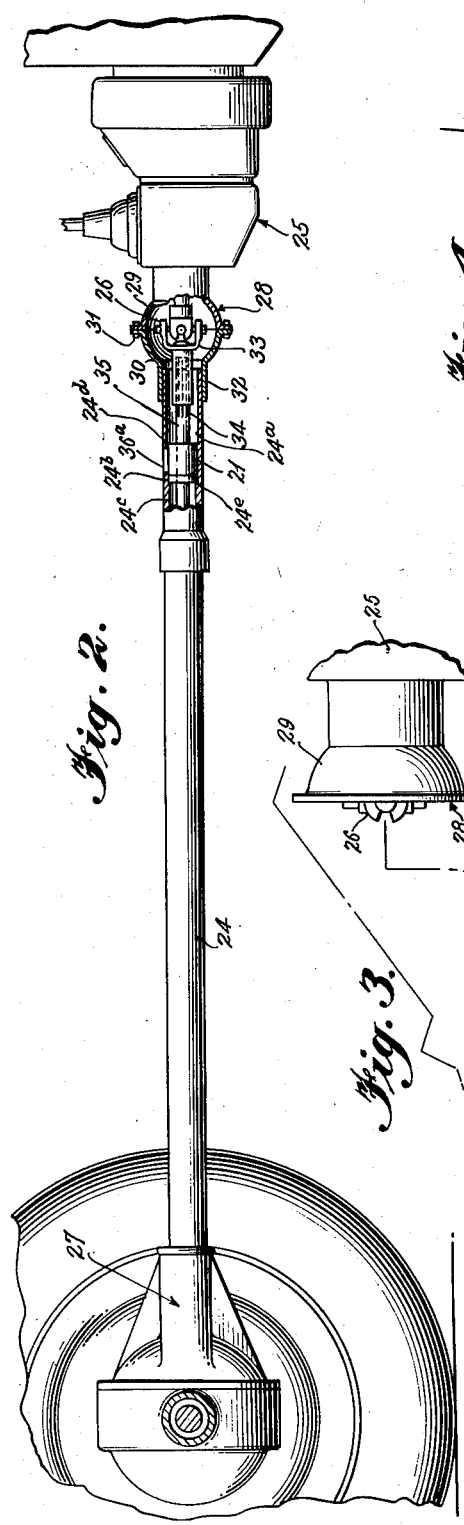
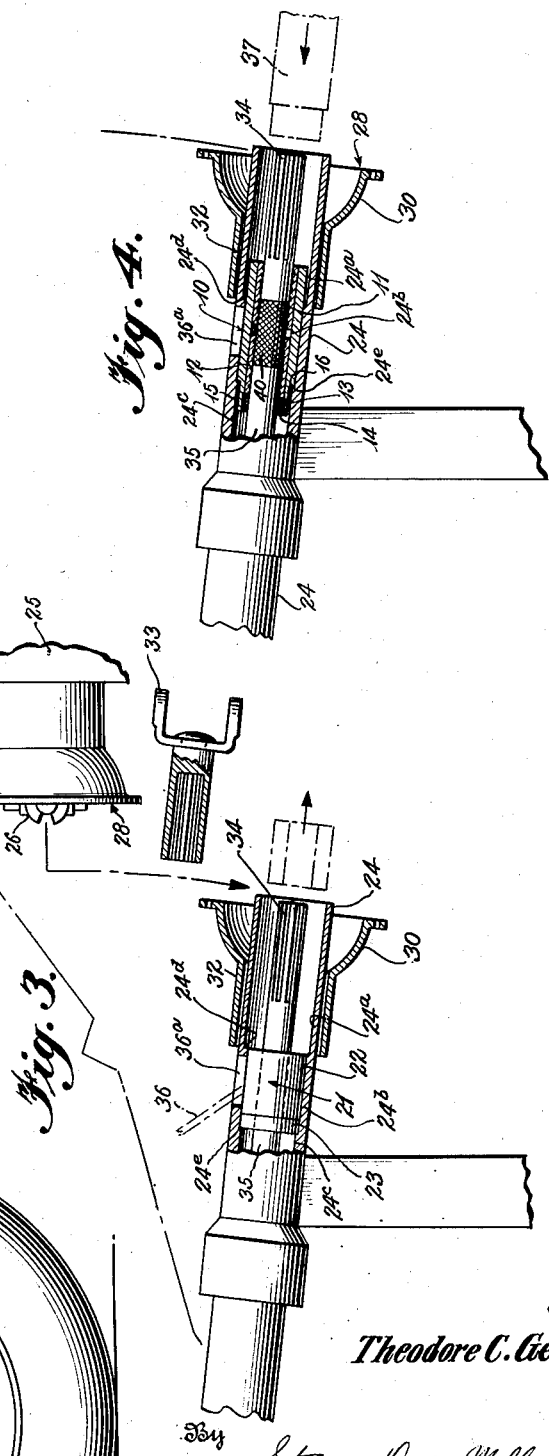
Inventor
Theodore C. Gerner
By Stevens, Davis, Miller & Mosher
Attorneys Patented Oct. 30, 1951

2,573,138

UNITED STATES PATENT OFFICE 2,573,138

DRIVE SHAFT BUSHING ASSEMBLY

Theodore C. Gerner, Oklahoma City, Okla.

Application April 29, 1948, Serial No. 24,004

8 Claims. (Cl. 308—36.1)

1

This invention relates to bearings, and more particularly to a bushing unit for the propeller shaft of an automobile and a method for installing the same.

In Patent 2,403,520 there is disclosed a drive shaft bushing assembly constituting a replacement part for installation in the propeller shaft housing of a motor vehicle adjacent the bell housing which surrounds the universal joint immediately to the rear of the transmission. The assembly of the prior patent is inserted in the propeller shaft housing between the original bearing and the splined end of the propeller shaft which is connected to one of the yokes of the universal. This repair operation can be effected without disassembly of the differential or transmission and the repair bushing then assumes the full load to which the original bearing was subjected.

In some models of automobiles, however, the distance between the splined end of the propeller shaft which engages one yoke of the universal and the propeller shaft bearing is too small to accommodate a repair bushing of adequate axial length. Furthermore, the installation of a new bushing in the position of the original is not feasible in these cases due to the fact that, by the time the bushing requires replacement, the shaft journal is so worn that it is no longer capable of proper coaction with a new bushing.

Accordingly, the problem presented is that of installing a replacement bushing which must coact with a different portion of the propeller shaft from the original bushing, but which must be held in the propeller shaft housing by the same means as are provided for holding the original bushing while avoiding as much as possible the disassembly of the drive mechanism.

This invention is addressed to overcoming the repair problem set forth above and to providing novel bushing for automobile propeller shafts which is characterized by ease of installation, large bearing area, excellent lubricant control and wide adaptability to various new and repair installations.

It is contemplated according to the present invention to provide a wholly new bushing characterized by axially spaced bearing surfaces which are adapted to coact with axially spaced journals of a shaft whereby to afford a high degree of shaft stability.

It is a further object of this invention to provide a novel bushing affording better control and distribution of lubricant than has been heretofore possible.

2

According to the method of the present invention, the novel bushing may be quickly and easily installed without requiring disassembly of the differential or transmission of the automobile and with only partial disassembly of the universal.

Other objects and advantages of this invention will be apparent upon consideration of the following detailed description thereof in conjunction with the annexed drawings wherein:

Figure 1 is a view in vertical section of a bearing unit constructed in accordance with the principles of the present invention;

Figure 2 illustrates a mechanism to which the repair process of the present invention may be applied, the illustration comprising portions in elevation and portions in section of a typical conventional torque tube drive assembly;

Figure 3 is a fragmentary view of the mechanism of Figure 2 in partially disassembled condition to illustrate one of the steps of the repair process of the present invention;

Figure 4 is a view similar to Figure 3 but illustrating the insertion of a bearing unit of the present invention as a further step in the repair process; and Figure 5 is a view, partially in elevation, of a torque tube drive assembly similar to that shown in Figure 2 but incorporating the bearing illustrated in Figure 1.

By referring in greater detail to Figure 1, it will be noted that the bearing unit there shown is comprised of an external sleeve 10 in the form of a hollow cylinder, two internal sleeves 11 and 12 and two annular sealing gaskets 13 and 14. The outer sleeve 10 is formed of steel and is machined at 15 to provide a portion of reduced external diameter terminating at an annular shoulder 16 lying normal to the long axis of the sleeve. Internally, the sleeve is machined at 17 to provide an annular socket for the reception of sealing gaskets 13 and 14. These gaskets lie between the left end of the sleeve 10, as viewed in Figure 1, and a shoulder 18 which results from the machining at 17. The internal sleeves 11 and 12 are formed of bronze, or other suitable bearing material, and are provided with dimples 19 on their inner surfaces to assist in the distribution of lubricant in a manner to be hereinafter more fully described.

The sealing gasket 13 is simply a ring of circular cross section formed of synthetic rubber, and the retaining gasket 14 is another annular rubber member held in an annular retainer 20 of L-cross section. The gasket 14 and the internal sleeves 11 and 12 are pressed into the interior of the sleeve 10 and hold themselves in position. Additionally, the gasket 14 also holds the compressible resilient gasket 13 in position between itself and the shoulder 18. If reference is made to Figure 1, it will be noted that the ring 14 is of channel cross section so that it can function as a retainer, and yet, when compressed against the ring 13, will expand somewhat radially to assist in the sealing function of the ring 16.

In the foregoing description, reference has been made to the bearing unit without regard to its position in use or the method by which it is installed. If now reference is made to Figures 2, 3 and 4, the environment and method of effecting the repair with the unit of Figure 1 can be understood. The bearing unit of the present invention is well adapted to replace a worn or defective bearing, such as is shown at 21. The bearing 21 is comprised of a sleeve member 22 and an annular sealing gasket 23. A typical installation of the bearing 21 is shown at Figure 2 wherein the unit 21 is mounted in the propeller shaft housing 24 of an automotive vehicle of the torque tube drive type. The portions of the vehicle that are shown in Figure 2 include a transmission 25, a universal 26 and a differential 27. The universal 26 is provided with a bell housing 28 which is composed of two flanged parts 29 and 30 bolted together at 31. The portion 30 of the bell housing 28 is provided with a cylindrical sleeve 32, and that sleeve forms a sliding fit over one end of the torque tube or propeller shaft housing 24. One yoke 33 of the universal 26 is connected through splines 34 to one end of the propeller shaft 35. This shaft is mounted for rotation in the bearing 21 and extends rearwardly to the differential where it is connected to one of the elements of the differential gear system.

The bearing unit 21 is frictionally held in the propeller shaft housing 24, and, if close reference is made to the drawings, the manner in which it is held will be apparent. The interior of the propeller shaft housing 24 is provided with cylindrical zones 24a, 24b and 24c of progressively decreasing diameter. Accordingly, two shoulders are formed, one at 24d and the other at 24e. The internal diameter of the zone 24a of the propeller shaft housing 24 is greater than the diameter of the bearing unit 21. The zone 24c is of lesser diameter than the diameter of the bearing unit 21, while the diameter of zone 24b is equal to the diameter of the bearing unit 21. Accordingly, the bearing unit is driven into position and is frictionally held in the zone 24b with the lubricant-retaining ring against the shoulder 24e. If, then, the bearing is to be replaced after wear, it is apparent that installation of another unit, such as at 21, could be accomplished only if the unit were replaced in exactly the same position. This, however, is undesirable, since the shaft 35 in that portion of its length which was in registry with the worn bearing 21 is very often worn and not in condition to act as a journal.

Accordingly, as a part of this invention, a method has ben developed for replacing units such as the unit 21 with the novel bearing unit of the present invention. To do this, it is first necessary to remove the bolts 31 which hold the parts 29 and 30 of the bell housing 28 together, and to slide the portion 30 of the bell housing to the left of Figure 2. Thereafter, the yoke 36 of the universal 26 is disconnected and is removed from the splined end 34 of the propeller shaft 35. It is now apparent that the bearing 21 can be removed without the necessity for disassembling any part of the differential or for disconnecting both ends of the propeller shaft and its housing. This is done by driving the bearing 21 out of the end of the housing 24 by the action of a drift diagrammatically indicated at 36, the drift operating through a slot 36a in the housing 24 which registers with the bearing 21, said slot being conventionally provided in torque tube drive assemblies of the type here under consideration. Of course, the sealing ring 23, which constitutes a part of the bearing assembly 21, is removed at the same time.

After the bearing unit 21 has been knocked out of the end of the shaft 24, as is indicated in Figure 3, a bearing assembly, such as that shown in Figure 1, is driven into the end of the housing 24 by the use of a sleeve-like driving tool indicated at 27 in Figure 4. The bearing 10 is driven in until its shoulder 16 abuts against the shoulder 24e of the torque tube 24, which shoulder originally received the sealing ring 23 of the bearing unit 21. The external dimensions of the unmachined portion of the outer sleeve 10 are such that it tightly engages the interior walls of the housing 24 in the zone 24b, while at zones 24a and 24c the fit affords considerable clearance. Thus, the bearing 10 is firmly gripped adjacent its mid point. On the other hand, a considerable amount of bearing surface is provided on either side of the journal for the old bearing 21 so that, should the shaft be scored or damaged as indicated at 40 in Figure 4, the bearing portions 11 and 12 are in a position to coact with different parts of the shaft 10 and to afford an adequate bearing surface.

After completion of the driving operation shown in Figure 4, the yoke 36 is restored to position and the housing 24 is raised until the yoke registers with the complementary elements of the universal. The universal is then reconnected, and the bell housing portion 30 is moved from left to right and bolted in position so that, upon completion of the entire operation, the torque tube drive assembly appears as is indicated in Figure 5.

In view of the fact that the machined portion 15 of the bushing of Figure 1 is of lesser diameter than the zone 24c, clearance is afforded in the event that the propeller shaft housing at zone 24c is not concentric with the zone at 24b. It is likewise apparent that, although the bearing unit of Figure 1 is held frictionally at zone 24b, as was the bearing 21, the bearing surfaces 11 and 12 act on either side of the worn area of the propeller shaft. This axial spacing of bearing surfaces has been found to afford a high degree of shaft rigidity and renders the bearing of Figure 1 desirable for use as an original installation as well as for a repair unit.

Of course, when the unit 21 is removed in the repair operation described above, the coacting sealing ring 23 is also removed. The new bearing, as shown in Figure 1, is provided with its own sealing rings or gaskets 13 and 14 which have been described above. By reference to Figure 5, it will be seen that these rings lie at the left end of the bearing unit, and in that position prevent lubricant from the universal from migrating down the propeller shaft to the differential 29. Thus, the bearing is lubricated from the universal, and the differential is protected against excess lubricant which, if allowed to accumulate, might migrate along the rear axle to the wheels and interfere with the action of the brakes. The space between the two bearing sleeves 11 and 12 affords a channel for the collection of lubricant, and the dimples 19 likewise constitute small receptacles. In this way, the journals of the shaft 35 are kept in well-lubricated condition at all times.

While the invention has been described with reference to but a single type of torque tube drive, it is apparent that it is susceptible of rather wide application in automotive constructions, and the foregoing description is therefore to be regarded as exemplary, rather than limiting, of the invention.

What is claimed is:

1. A bushing for installation in the propeller shaft housing of an automobile comprising an outer sleeve having axially extending end zones of a diameter less than the internal diameter of the housing in which it is to be installed and a zone intermediate said end zones which is of a diameter substantially equal to the internal diameter of the housing in which it is to be installed, and inner bearing means including bearing surfaces extending under each end zone.

2. A bushing for installation in the propeller shaft housing of an automobile comprising an outer sleeve having axially extending end zones of a diameter less than the internal diameter of the housing in which it is to be installed and a zone intermediate said end zones which is of a diameter substantially equal to the internal diameter of the housing in which it is to be installed, and a pair of axially spaced bearing sleeves within said outer sleeve, a substantial portion of each sleeve being in radial registry with said one of said end zones.

3. A bushing for installation in the propeller shaft housing of an automobile comprising an outer sleeve having axially extending end zones of a diameter less than the internal diameter of the housing in which it is to be installed and a zone intermediate said end zones which is of a diameter substantially equal to the internal diameter of the housing in which it is to be installed, a pair of axially spaced bearing sleeves within said outer sleeve, a substantial portion of each sleeve being in radial registry with said one of said end zones, and internal sealing rings between one end of said outer sleeve and one of said bearing sleeves.

4. A bushing for installation in the propeller shaft housing of an automobile comprising an outer sleeve having an annular internal cavity therein at one end thereof and having axially extending external end zones of a diameter less than the internal diameter of the housing in which it is to be installed and an external zone intermediate said end zones which is of a diameter substantially equal to the internal diameter of the housing in which it is to be installed, inner bearing means including bearing surfaces extending under each end zone, and annular sealing gaskets mounted in said cavity.

5. In an automotive vehicle, a propeller shaft housing, a propeller shaft in said housing, spaced journals for said shaft adjacent one end of the housing, said housing having a portion of small diameter surrounding one of the journals, a portion of large diameter surrounding the other of the journals and a portion of intermediate diameter surrounding the shaft between the journals, a sleeve frictionally engaging the housing portion of intermediate diameter and extending into the portions of small and large diameter, and inner bearing means including bearing surfaces held by said outer sleeve and engaging said journals.

6. In an automotive vehicle, a propeller shaft housing, a propeller shaft in said housing, journals for said shaft adjacent one end of the housing, said housing having a portion of small diameter surrounding one of the journals, a portion of large diameter surrounding the other of the journals and a portion of intermediate diameter surrounding the shaft between the journals, a sleeve frictionally engaging the portion of intermediate diameter and extending into the portions of small and large diameter, and a pair of axially spaced bearing sleeves within said outer sleeve, said bearing sleeves being disposed in bearing engagement with said journals.

7. In an automotive vehicle, a propeller shaft housing, a propeller shaft in said housing, spaced journals for said shaft adjacent one end of the housing, said housing having a portion of small diameter surrounding one of the journals, a portion of large diameter surrounding the other of the journals and a portion of intermediate diameter surrounding the shaft between the journals, a sleeve frictionally engaging the portion of intermediate diameter and extending into the portions of small and large diameter, a pair of axially spaced bearing sleeves within said outer sleeve, one of said bearing sleeves surrounding each of said journals, and internal sealing rings held by said outer ring between one end of said outer sleeve and one of said bearing sleeves.

8. In an automotive vehicle, a propeller shaft housing, a propeller shaft in said housing, journals for said shaft adjacent one end of the housing, said housing having a portion of small diameter surrounding one of the journals, a portion of large diameter surrounding the other of the journals and a portion of intermediate diameter surrounding the shaft between the journals, a sleeve frictionally engaging the portion of intermediate diameter and loosely engaging the portions of small and large diameter, a pair of axially spaced bearing sleeves within said outer sleeve, said bearing sleeves engaging said journals, and internal sealing rings between the end of said outer sleeve underlying the housing portion of smallest diameter and the adjacent bearing sleeve.

THEODORE C. GERNER.

REFERENCES CITED

The following references are of record in the file of this patent:

UNITED STATES PATENTS

| Number | Name | Date |
|---|---|---|
| 1,043,603 | Jones | Nov. 5, 1912 |
| 1,992,815 | Craney | Feb. 26, 1935 |
| 2,291,420 | Swenson | July 28, 1942 |
| 2,403,520 | Gerner | July 9, 1946 |